United States Patent
Choda et al.

(10) Patent No.: US 9,951,401 B2
(45) Date of Patent: Apr. 24, 2018

(54) BORON CONTAINING ALUMINUM MATERIAL AND METHOD FOR MANUFACTURING THE SAME

(71) Applicant: Kabushiki Kaisha Kobe Seiko Sho (Kobe Steel, Ltd.), Hyogo (JP)

(72) Inventors: Takashi Choda, Kobe (JP); Yukihide Honda, Kobe (JP); Tsuyoshi Suzuki, Kobe (JP); Hitoshi Ishida, Kobe (JP); Ryutaro Wada, Shinagawa-ku (JP); Yoshiki Takebayashi, Shinagawa-ku (JP); Tatsuhiko Kusamichi, Kobe (JP); Fumiaki Kudo, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 368 days.

(21) Appl. No.: 14/428,971

(22) PCT Filed: Oct. 7, 2013

(86) PCT No.: PCT/JP2013/077260
§ 371 (c)(1),
(2) Date: Mar. 17, 2015

(87) PCT Pub. No.: WO2014/061494
PCT Pub. Date: Apr. 24, 2014

(65) Prior Publication Data
US 2015/0218681 A1    Aug. 6, 2015

(30) Foreign Application Priority Data

Oct. 17, 2012   (JP) ................................ 2012-229513

(51) Int. Cl.
*C22C 32/00*    (2006.01)
*C22C 21/00*    (2006.01)
(Continued)

(52) U.S. Cl.
CPC ............ *C22C 32/0073* (2013.01); *B22F 3/04* (2013.01); *B22F 3/15* (2013.01); *B22F 3/18* (2013.01);
(Continued)

(58) Field of Classification Search
CPC .......... B22F 2998/10; B22F 3/18; B22F 3/04; B22F 3/15; B22F 3/20; B22F 3/02;
(Continued)

(56) References Cited

U.S. PATENT DOCUMENTS 4,595,559 A     6/1986  Planchamp
5,478,418 A  *  12/1995 Miura ................. C22C 1/0416
                                                       148/438

(Continued)

FOREIGN PATENT DOCUMENTS

EP       0521580 A1    1/1993
EP       0521580    *  7/1993

(Continued)

OTHER PUBLICATIONS

International Search Report; PCT/JP2013/077260; dated Dec. 17, 2013.

(Continued)

*Primary Examiner* — Colleen P Dunn
*Assistant Examiner* — Nicholas A Wang
(74) *Attorney, Agent, or Firm* — Studebaker & Brackett PC

(57) ABSTRACT

This boron-containing aluminum material is obtained by carrying out the following: a mixed powder, obtained by mixing a boride powder containing first boride particles, second boride particles and particles of unavoidable impurities with an aluminum powder or aluminum alloy powder that forms a matrix, is filled into in a square aluminum pipe (Continued)

having a prescribed shape and then rolled by using pressure rolls the gap between which is adjusted.

6 Claims, 3 Drawing Sheets

(51) Int. Cl.
*G21C 19/40* (2006.01)
*G21F 5/005* (2006.01)
*B22F 3/04* (2006.01)
*B22F 3/15* (2006.01)
*B22F 3/18* (2006.01)
*B22F 3/20* (2006.01)
*C22C 1/05* (2006.01)
*C22C 29/14* (2006.01)

(52) U.S. Cl.
CPC ............... *B22F 3/20* (2013.01); *C22C 1/051* (2013.01); *C22C 21/00* (2013.01); *C22C 29/14* (2013.01); *G21C 19/40* (2013.01); *G21F 5/005* (2013.01); *B22F 2998/10* (2013.01)

(58) Field of Classification Search
CPC ... B22F 3/17; C22C 21/00; C22C 1/05; C22C 1/1084; C22C 29/14; C22C 32/0073; G21C 19/40; G21F 5/005
USPC .......................................................... 75/254
See application file for complete search history.

(56) References Cited

U.S. PATENT DOCUMENTS

| | | | |
|---|---|---|---|
| 6,602,314 B1 | 8/2003 | Sakaguchi et al. | |
| 7,125,515 B2* | 10/2006 | Aruga | C22C 1/026 148/550 |
| 7,160,627 B2* | 1/2007 | Pyzik | C04B 41/009 428/539.5 |
| 2003/0179846 A1 | 9/2003 | Murakami et al. | |
| 2005/0258405 A1* | 11/2005 | Sayala | G21F 1/00 252/582 |
| 2006/0137783 A1 | 6/2006 | Aruga et al. | |
| 2007/0064860 A1* | 3/2007 | Kusui | B21C 23/002 376/333 |
| 2009/0220814 A1* | 9/2009 | Nishiyama | B22F 3/18 428/554 |

FOREIGN PATENT DOCUMENTS

| | | |
|---|---|---|
| JP | S59-501672 A | 10/1984 |
| JP | 2001-042089 A | 2/2001 |
| JP | 2002-022888 A | 1/2002 |
| JP | 2002-250791 A | 9/2002 |
| JP | 2010-255033 A | 11/2010 |

OTHER PUBLICATIONS

Written Opinion of the International Searching Authority; PCT/JP2013/077260; dated Dec. 17, 2013.

* cited by examiner (a)

(b) A-A CROSS SECTION (c) B-B CROSS SECTION

BORON CONTAINING ALUMINUM MATERIAL AND METHOD FOR MANUFACTURING THE SAME

TECHNICAL FIELD

The present invention relates to a boron-containing aluminum material improved in machinability and a method for manufacturing the same. Below, boron will be also referred to as "boron" or "B".

BACKGROUND ART

In recent years, there has been a growing need for intermediate storage of spent nuclear fuel (which will be hereinafter referred to as "SF") in a nuclear power plant. Further, there is a trend of shift from wet storage (storage in water) to dry storage (storage by air cooling) for intermediate storage of SF. Accordingly, SF has a higher heat value and neutron generation density than in the related art. Therefore, a boron-containing aluminum material for forming a cask or a canister which is a SF storage container is also required to have a higher boron content than ever before.

For manufacturing a boron-containing aluminum alloy, a melting/casting method has been used in the related art. The melting/casting methods include: a method in which a powdery boron is added to an aluminum alloy base metal, and it is molten and casted (which will be hereinafter referred to as "the former melting/casting method"); or a method in which fluoroborate such as $KBF_4$ is added with a catalyst into an aluminum molten metal to generate an aluminum-boron intermediate alloy, followed by adjustment of the boron concentration for casting (which will be hereinafter referred to as "the latter melting/casting method". The ingot casted in this manner is formed into a sheet material by rolling treatment, extrusion treatment, or the like.

With the former melting/casting method described above, there are formed various boron compounds crystallized into the aluminum-boron alloy, resulting in degradation of machinability. Further, a difference in specific gravity among various formed boron compounds causes the boron compounds to precipitate or (to float), resulting in ununiform distribution (i.e., segregation) of boron. This leads to the formation of sites with a lower concentration than the added boron content. As a casting, the upper limit of the actually obtainable boron concentration is about 1 mass %.

Further, the latter melting/casting method described above essentially requires boron (concentrated boron) increased in content of boron isotope with a mass number of 10 absorbing thermal neutrons present in a ratio of 18.4 mass % in natural boron (which will be hereinafter referred to as "B-10"). However, the concentrated boron is very expensive, incurring a problem in terms of cost.

Under such circumstances, the following technologies are also proposed.

There is disclosed a metal matrix composite material having a pair of metal sheets including a mixed material interposed therebetween: the mixed material is a metal matrix composite material including a metal powder and ceramic particles having a neutron absorbing function; the ceramic particles include $B_4C$ particles; the area density of B-10 included in the $B_4C$ particles is set at 40 mg/cm$^2$ or more; and the neutron absorption rate achieved by the $B_4C$ particles is 90% or more (see Patent Literature 1).

CITATION LIST

Patent Literature

[Patent Literature 1] Japanese Unexamined Patent Publication No. 2010-255033

SUMMARY OF INVENTION

Technical Problem

However, the technology disclosed in the Patent Literature 1 also has the following problem.

With the technology described in Patent Literature 1, $B_4C$ particles are used as ceramic particles having a neutron absorbing function. However, the Vickers hardness of the $B_4C$ particles is as very hard as about 4000 HV. Therefore, unfavorably, the metal matrix composite material including the $B_4C$ particles is poor in machinability including cutting property or the like, and the tool life for machining the metal matrix composite material also becomes shortened. Further, the $B_4C$ particles are unfavorably high in cost.

It is an object of the present invention to provide a boron-containing aluminum material improved in machinability, and also having a neutron absorbing function while being low in cost, and a method for manufacturing the same.

Solution to Problem

In order to attain the object, an invention according to a first aspect of the present invention is a boron-containing aluminum material including a matrix including an aluminum or aluminum alloy powder, and a boride powder. The boride powder is dispersed in the matrix. The boride powder includes at least one or more kinds of first boride particles selected from the group consisting of $AlB_{12}$, $CaB_6$, and $SiB_6$, at least one or more kinds of second boride particles selected from the group consisting of FeB, $MnB_2$, $Fe_2B$, and $AlB_2$, and inevitable impurity particles.

An invention according to a second aspect of the present invention is the invention according to the first aspect, characterized in that the ratio of the second boride particles occupied in the boride powder is 20 mass % or more.

An invention according to a third aspect of the present invention is the invention according to the first aspect or the second aspect, characterized in that the ratio of the first boride particles occupied in the boride powder is 50 mass % or more.

An invention according to a fourth aspect of the present invention is the invention according to the first aspect, characterized in that the ratio of particles with a particle size of 350 μm or less (but not including zero) of the first boride particles and the second boride particles occupied in the boride powder is 90 mass % or more.

An invention according to a fifth aspect of the present invention is the invention according to the first aspect, characterized in that the average particle size of the boride powder is 1.5 times to 4 times the average particle size of the aluminum or aluminum alloy powder.

An invention according to a sixth aspect of the present invention is a method for manufacturing the boron-containing aluminum material according to any one of the first to fifth aspects.

The method includes:

a powder mixing step of mixing a boride powder including first boride particles, second boride particles, and inevitable impurity particles, and an aluminum or aluminum alloy powder serving as a matrix, and a main forming step of performing main forming by at least any one technique of a technique of directly extruding the mixed powder mixed in the powder mixing step, a technique of extruding, forging, or rolling a preformed compact obtained by preliminarily forming the mixed powder into a prescribed shape, and a technique of packing the mixed powder or the preformed compact in a metal container with a prescribed shape, and performing extrusion, forging, or rolling.

An invention according to a seventh aspect of the present invention is the invention according to the sixth aspect, characterized in that any one method of HIP, CIP, and a uniaxial pressing method in a die is used for the preliminary forming.

An invention according to an eighth aspect is the invention according to the sixth or seventh aspect, characterized in that the metal container in the prescribed shape is a tubular member formed in a rectangular shape in cross section, and made of aluminum or an aluminum alloy, and after filling the tubular member with the mixed powder or the preformed compact, one or both openings of the tubular member are closed by a sheet or a block made of aluminum or an aluminum alloy so as to enable degassing.

Advantageous Effects of the Invention

As described up to this point, the boron-containing aluminum material in accordance with the present invention is a boron-containing aluminum material including a matrix including an aluminum or aluminum alloy powder, and a boride powder. The boride powder is dispersed in the matrix. The boride powder includes at least one or more kinds of first boride particles selected from the group consisting of $AlB_{12}$, $CaB_6$, and $SiB_6$, at least one or more kinds of second boride particles selected from the group consisting of FeB, $MnB_2$, $Fe_2B$, and $AlB_2$, and inevitable impurity particles.

As a result of this, it is possible to achieve a boron-containing aluminum material improved in machinability, and also having a neutron absorbing function while being low in cost. Further, the first boride particles and the second boride particles can be appropriately mixed. For this reason, it also becomes possible to adjust the improvement degree of the machinability and the degree of the neutron absorbing function extensively.

Further, a method for manufacturing the boron-containing aluminum material according to the present invention includes: a powder mixing step of mixing a boride powder including first boride particles, second boride particles, and inevitable impurity particles, and an aluminum or aluminum alloy powder serving as a matrix, and a main forming step of performing main forming by at least any one technique of a technique of directly extruding the mixed powder mixed in the powder mixing step, a technique of extruding, forging, or rolling a preformed compact obtained by preliminarily forming the mixed powder into a prescribed shape, and a technique of packing the mixed powder or the preformed compact in a metal container with a prescribed shape, and performing extrusion, forging, or rolling.

As a result of this, it is possible to manufacture a boron-containing aluminum material improved in machinability, and also having a neutron absorbing function while being low in cost without requiring a high-temperature process such as a melting/casting method.

BRIEF DESCRIPTION OF DRAWINGS

FIG. 2 are each an explanatory view for schematically illustrating a method for manufacturing the boron-containing aluminum material of one embodiment of the present invention, wherein FIG. 2(a) is an explanatory view for schematically illustrating a rolling process of the same tubular member filled with a mixed powder, FIG. 2(b) is a cross sectional view along A-A of the same tubular member filled with a mixed powder before rolling; and FIG. 2(c) is a cross sectional view along B-B of the same tubular member filled with a mixed powder after rolling.

DESCRIPTION OF EMBODIMENTS

Figure 1:
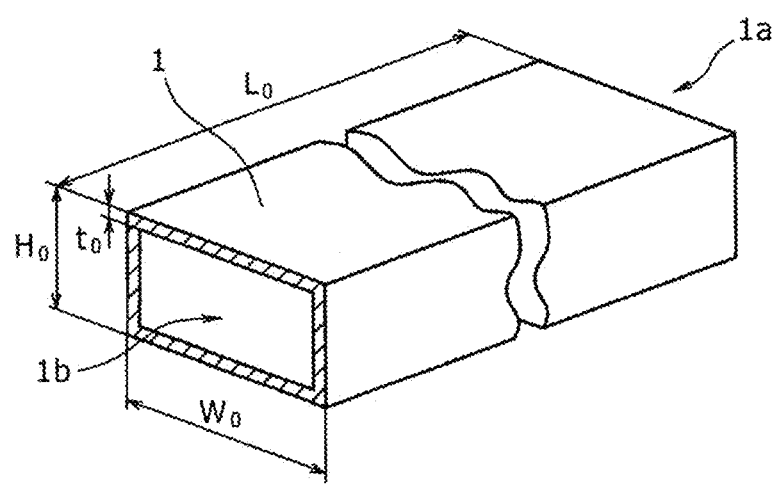
FIG. 1 is a perspective view of a tubular member made of aluminum formed in a rectangular shape in cross section as a metal container for filling a mixed powder therein, for use in a method for manufacturing a boron-containing aluminum material of one embodiment of the present invention.

Below, the present invention will be described in details while illustrating embodiments.

(Configuration of Boron-Containing Aluminum Material in Accordance with the Present Invention)

A boron-containing aluminum material in accordance with the present invention is a boron-containing aluminum material including a boride powder dispersed in a matrix formed of an aluminum or aluminum alloy powder. The boride powder includes at least one or more kinds of first boride particles selected from the group consisting of $AlB_{12}$, $CaB_6$, and $SiB_6$, at least one or more kinds of second boride particles selected from the group consisting of FeB, $MnB_2$, $Fe_2B$, and $AlB_2$, and inevitable impurity particles. Incidentally, the mixing ratio of an aluminum or aluminum alloy powder, and a boride powder in the boron-containing aluminum powder is arbitrary. Whereas, the aluminum or aluminum alloy powder, the first boride powder, and the second boride powder which are the raw material powders respectively include the inevitable impurities, and the inevitable impurity particles are particles derived therefrom.

Because of the foregoing configuration, the present invention can implement a boron-containing aluminum material improved in machinability, and having a neutron absorbing function while being low in cost. Further, the first boride particles and the second boride particles can be appropriately mixed. For this reason, it also becomes possible to adjust the improvement degree of the machinability and the degree of the neutron absorbing function extensively.

As the aluminum or aluminum alloy powder serving as the matrix of the boron-containing aluminum material, powders of various types of alloys such as pure aluminum (JIS 1050, 1070, and the like), Al—Cu system alloys (JIS 2017 and the like), Al—Mg—Si system alloys (JIS 6061 and the like), Al—Zn—Mg system alloys (JIS 7075 and the like), and Al—Mn system alloys can be used alone, or in mixture of two or more thereof.

The boride powder imparting the neutron absorbing function includes first boride particles having a lower hardness than the Vickers hardness of $B_4C$ particles, second boride particles still lower in hardness than the first boride particles, and inevitable impurity particles.

Further, as the first boride particles, there can be used at least one or more kinds of particles selected from the group consisting of $AlB_{12}$, $CaB_6$, and $SiB_6$. Whereas, as the second boride particles, there can be used at least one or more kinds of particles selected from the group consisting of FeB, $MnB_2$, $Fe_2B$, and $AlB_2$. Furthermore, various inevitable impurity particles are generated depending upon how the first boride particles and the second boride particles are respectively selected, and the content thereof is preferably controlled at 10 mass % or less.

Incidentally, $B_4C$ particles may be included in a small amount as the first boride particles to such a degree as not to adversely affect the machinability of the boron-containing aluminum material.

The foregoing configuration is adopted for the boride powders. As a result, the machinability of the boron-containing aluminum material is improved primarily by the second boride particles, and secondarily by the first boride particles. From the viewpoint of improvement of the machinability of the boron-containing aluminum material, the ratio of the second boride particles occupied in the boride powder is preferably 20 mass % or more.

Whereas, from the viewpoint of improvement of the neutron absorbing function of the boron-containing aluminum material, the ratio of the first boride particles occupied in the boride powder is preferably 50 mass % or more.

Furthermore, the foregoing configuration is adopted for the boride powders. As a result, the neutron absorbing function of the boron-containing aluminum material is imparted primarily by the first boride particles, and secondarily by the second boride particles.

Further, as the boride powder, the first boride particles and the second boride particles can be appropriately combined. For this reason, it also becomes possible to adjust the improvement degree of the machinability and the degree of the neutron absorbing function extensively.

The average particle size of the aluminum or aluminum alloy powder has no particular restriction. However, there can be used the powder with an upper limit value thereof of generally 200 µm or less, and preferably 170 µm or less (e.g., 165 µm). The lower limit value of the average particle size has no particular restriction so long as manufacturing is possible, and is generally 0.5 µm or more, and preferably 10 µm or more. Incidentally, the average particle size of the aluminum or aluminum alloy powder in the present invention represents the measured value by the laser diffraction type particle size distribution measuring method. The definition of the average particle size is according to the volume distribution median diameter (d(50)). That is, the value at 50% of the particle size distribution accumulation is adopted. The powder shape is also not restricted. For example, the aluminum or aluminum alloy powder may be in any shape such as tear-drop shape, perfect spherical shape, spheroidal shape, flaky shape, or amorphous shape.

In view of uniform dispersion of the boride powder into the matrix including an aluminum or aluminum alloy powder, the average particle size of the boride powder is preferably set larger than the average particle size of the aluminum or aluminum alloy powder. More specifically, the average particle size of the boride powder is preferably 1.5 times (e.g., 265 µm) to 4 times the average particle size of the aluminum or aluminum alloy powder. By achieving such uniformalization, the machinability is more improved, and the neutron absorbing ability is also more improved. Incidentally, the average particle size of the boride powder in the present invention represents the measured value by the laser diffraction type particle size distribution measuring method. The definition of the average particle size is according to the volume distribution median diameter (d(50)). That is, the value at 50% of the particle size distribution accumulation is adopted. The powder shape is also not restricted. For example, the boride powder may be in any shape such as tear-drop shape, perfect spherical shape, spheroidal shape, flaky shape, or amorphous shape.

However, from the viewpoints of enhancing the dispersibility of the boride powder, and enhancing the density of B-10, the ratio of particles with a particle size of 350 µm or less (but not including zero) of the first boride particles and the second boride particles occupied in the boride powder is more preferably 90 mass % or more. Incidentally, the definition of the particle size is according to the volume distribution median diameter (d(50)). Namely, the value at 50% of the particle size distribution accumulation is adopted.

(Configuration of Method for Manufacturing the Boron-Containing Aluminum Material in Accordance with the Present Invention)

A method for manufacturing the boron-containing aluminum material in accordance with the present invention includes: a powder mixing step of mixing a boride powder including first boride particles, second boride particles, and inevitable impurity particles, and an aluminum or aluminum alloy powder serving as the matrix; and a main forming step of performing main forming by at least any one technique of a technique of directly extruding the mixed powder mixed in the powder mixing step, a technique of extruding, forging, or rolling a preformed compact obtained by preliminarily forming the mixed powder into a prescribed shape, and a technique of packing the mixed powder or the preformed compact in a metal container with a prescribed shape, and performing extrusion, forging, or rolling. Incidentally, in the forming step, extrusion and rolling can also be performed in combination. Whereas, in the powder mixing step, a binder may be mixed, and sintering may be performed after forming. However, these are not essential in the present invention, and are performed, if required.

Because of the foregoing configuration, it is possible to manufacture a boron-containing aluminum material improved in machinability, and having a neutron absorbing function while being low in cost without requiring a high-temperature process as in a melting/casting method.

Below, the method for manufacturing the boron-containing aluminum material in accordance with the present invention will be described more specifically by reference to the accompanying drawings.

Figure 2:
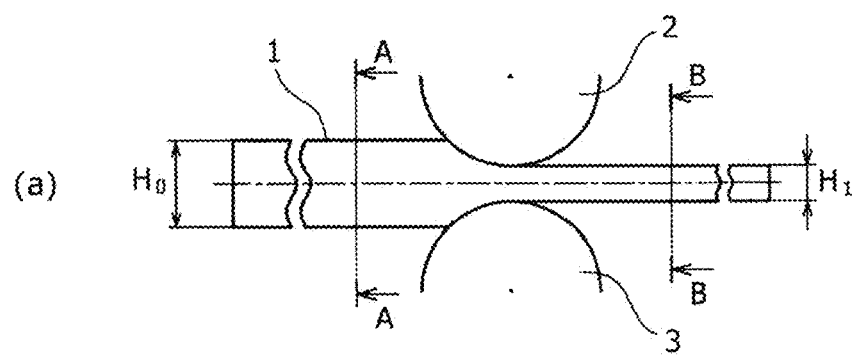
Figure 2:
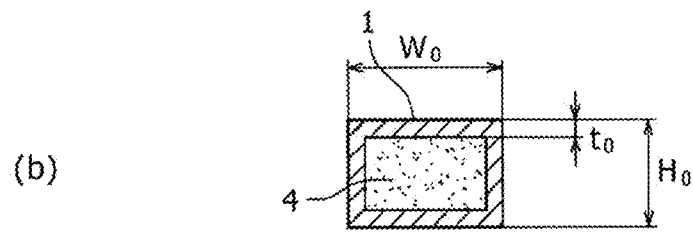
Figure 2:
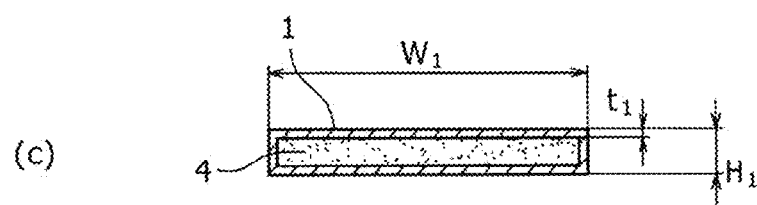

FIG. 1 is a perspective view of a tubular member made of aluminum formed in a rectangular shape in cross section as a metal container for filling a mixed powder therein, for use in a method for manufacturing a boron-containing aluminum material of one embodiment of the present invention. FIG. 2 are each an explanatory view for schematically illustrating the method for manufacturing the boron-containing aluminum material of one embodiment of the present invention. FIG. 2(a) is an explanatory view for schematically illustrating a rolling process of the same tubular member filled with a mixed powder, FIG. 2(b) is a cross sectional view along A-A of the same tubular member filled with a mixed powder before rolling. FIG. 2(c) is a cross sectional view along B-B of the same tubular member filled with a mixed powder after rolling.

In FIG. 1, 1 represents a tubular member made of aluminum, formed in a rectangular shape in cross section as a metal container (which will be hereinafter referred to as an "aluminum square pipe"). The cross sectional shape of the aluminum square pipe 1 has a width of $W_O$, a height of $H_O$, a thickness of $t_O$, and a length of $L_O$. In the present embodiment, from the viewpoint of reduction in weight, a description will be mainly given to the one made of aluminum as a metal container, which is not necessarily exclusive. For example, it is possible to use various metal materials such as those made of steel and made of stainless steel. Further, in the present embodiment, a pipe widely commercially available as a metal container will be described as an example, but is not necessarily exclusive. Various ones are usable. Further, the cross sectional shapes are also preferably rectangular shapes also including a rectangle and a rounded corner rectangle, which are not necessarily exclusive. Various shapes such as circle and trapezoid are usable.

(Powder Mixing Step)

The boride powder including the first boride particles, the second boride particles, and inevitable impurity particles, and the aluminum or aluminum alloy powder serving as a matrix are mixed for a prescribed time (e.g., about 10 minutes to 10 hours) using, for example, various mixers such as a V type mixer, a V blender, and a cross rotary mixer, a JET mill, a vibration mill, and a planetary mill, thereby to prepare a mixed powder 4 (shown in FIG. 2 later).

(Main Forming Step)

First, the aluminum square pipe 1 shown in FIG. 1 is filled with the mixed powder 4. Then, one or both of the right end 1a and the left end 1b of the aluminum square pipe 1 are closed by being blocked with, for example, spot welding or clinching so as to prevent leakage of the mixed powder 4, and to enable degassing using a sheet or a block made of aluminum or aluminum alloy, thereby to prepare a workpiece.

Then, as shown in FIG. 2(a), the workpiece is passed through rolling rolls 2 and 3 adjusted to have a prescribed gap therebetween from the left side of the paper plane for reduction. This results in a workpiece with a prescribed height $H_1$ as shown in the right side of the paper plane of the same figure. This step is performed a prescribed times until the prescribed height $H_1$ is obtained, if required.

FIG. 2(b) is a cross sectional view along A-A of the aluminum square pipe 1 as a tubular member filled with the mixed powder 4 before rolling shown in FIG. 1.

FIG. 2(c) is a cross sectional view along B-B of the aluminum square pipe 1 filled with the mixed powder 4 after rolling shown in FIG. 1. As shown in FIG. 2(c), by being rolled, the aluminum square pipe 1 is changed in cross sectional shape to a width of $W_1$ and a height of $H_1$, and in thickness to $t_1$, respectively.

Incidentally, in the present embodiment, as the main forming step, a description has been given to the technique in which the mixed powder 4 is filled in the aluminum square pipe 1 as a metal container with a prescribed shape for rolling. However, this method is not necessarily exclusive, and various main forming steps are usable. The main forming step of performing main forming by, for example, at least any one technique of a technique of directly extruding the mixed powder 4 mixed in the powder mixing step, a technique of extruding, forging, or rolling a preformed compact obtained by preliminarily forming the mixed powder 4 into a prescribed shape, and a technique of packing the mixed powder 4 or the preformed compact in a metal container with a prescribed shape, and performing extrusion, forging, or rolling.

Further, for the preliminary forming, there is used any one method of HIP, CIP, and a uniaxial pressing method in a die.

Incidentally, in the present embodiment, a description has been given to the example in which the aluminum square pipe 1 is filled with the mixed powder 4. However, this is not necessarily exclusive. Namely, it is also possible to adopt a structure of a metal container in a prescribed shape formed in a rectangular shape in cross section which is a tubular member made of aluminum or aluminum alloy, the tubular member being filled with a preformed compact obtained by preliminarily forming the mixed powder 4 into a prescribed shape, and then one or both openings of the tubular member being closed by a sheet or a block made of aluminum or aluminum alloy so as to enable degassing (specifically, a structure in which one or both openings of the tubular member is closed by being blocked with, for example, spot welding or clinching so as to prevent leakage of the mixed powder 4, and to enable degassing using a sheet or a block made of aluminum or aluminum alloy).

Example 1

An example to which a method for manufacturing the boron-containing aluminum material in accordance with the present invention shown in FIGS. 1 and 2 will be described in some details.

<Manufacturing Conditions 1>

Boride powder (i): Kind of mixing particles (see Table 1 below)

Average particle size 265 μm

Aluminum powder (ii): Pure aluminum

Average particle size 165 μm

Mass of mixed powder 4 (mass of (i) mass of (ii)=1:1):90 g

Rolling speed: 5 m/min

Rolling temperature: 400° C.

Aluminum square pipe 1 (before rolling): height $H_0$=13.6 mm

Thickness $t_0$=1.0 mm

Aluminum square pipe 1 (after rolling): height $H_1$=1.6 mm

Total reduction ratio $\{(H_0-H_1)/H_0 \times 100\}$:88.2

TABLE 1

| Boride powder (i) | | | | |
|---|---|---|---|---|
| First boride particles | | Second boride particles | | Inevitable impurity |
| $AlB_{12}$ | $CaB_6$ | $MnB_2$ | $AlB_2$ | particles |
| 56.7 | 3.4 | 27.8 | 7.4 | The balance |

Unit: mass %

Figure 3:
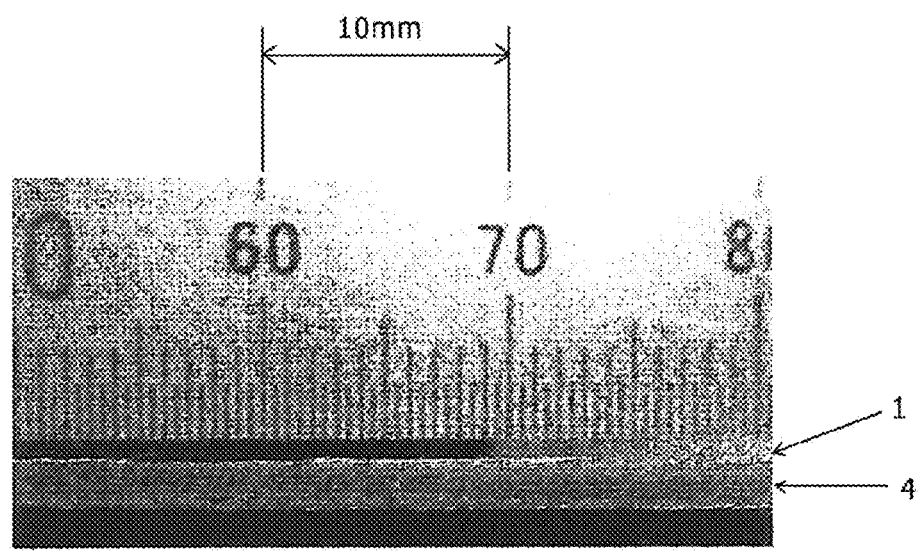
FIG. 3 is a drawing-substituting photograph corresponding to the cross-sectional view along B-B of an aluminum square pipe after rolling shown in FIG. 2(c).

The changes in B-10 densities before and after rolling of the boron-containing aluminum materials formed based on the manufacturing conditions described up to this point are shown in Table 2 below. From Table 2, a remarkable increase in B-10 density is observed after rolling, and is found to contribute to the neutron absorbing function. Further, the cross sectional photograph after rolling corresponding to the B-B cross sectional view of the aluminum square pipe 1 shown in FIG. 2(c) is shown in FIG. 3. This also indicates that favorable rolling has been performed.

Whereas, for comparison of the machinability, the boron-containing aluminum material (Example 1) manufactured in this manner, and a boron-containing aluminum material including $B_4C$ particles as a main component as a related-art boride powder were subjected to cutting. As a result, it has been proved that the one shown in Example 1 is improved in cutting machinability, and that chipping of a tool does not occur. This is presumably due to the fact that, as the boride powder forming the boron-containing aluminum material of the present invention, there are included the second boride particles lower in hardness than the first boride particles.

TABLE 2

| B-10 density before rolling [g/cm³] | B-10 density after rolling [g/cm³] | |
|---|---|---|
| 0.048 | 0.097 | Example 1 |
| 0.051 | 0.104 | Example 2 |

Example 2

Manufacturing Conditions 2

Boride powder (i): the same as in the manufacturing conditions 1
Aluminum powder (ii): the same as in the manufacturing conditions 1
Mass of mixed powder 4 (mass of (i): mass of (ii)=1:1):180 g
Rolling speed: the same as that in the manufacturing conditions 1
Rolling temperature: the same as that in the manufacturing conditions 1
Aluminum square pipe 1 (before rolling): height $H_0$=22 mm Thickness $t_0$=1.0 mm
Aluminum square pipe 1 (after rolling): height $H_1$=5.8 mm
Total reduction ratio $\{(H_0-E_1)/H_0 \times 100\}$:73.6

The changes in B-10 densities before and after rolling of the boron-containing aluminum materials formed based on the manufacturing conditions described up to this point are shown in Table 2 below. From Table 2, also in the case of Example 2, a remarkable increase in B-10 density is observed after rolling, and is found to contribute to the neutron absorbing function.

The present invention was described in details and by reference to specific embodiments. However, it is obvious to those skilled in the art that various changes and modifications may be added thereto without departing from the spirit and the scope of the present invention.

The present application is based on Japanese Patent Application No. 2012-229513 filed on Oct. 17, 2012, the entire content of which is incorporated herein by reference.

INDUSTRIAL APPLICABILITY

The boron-containing aluminum material of the present invention is preferable as a forming material of a storage container (cask or canister) for a spent nuclear fuel in a nuclear power plant.

REFERENCE SIGNS LIST

1 Aluminum square pipe
1a Right end of aluminum square pipe 1
1b Left end of aluminum square pipe 1
2, 3 Rolling roll
4 Mixed powder

The invention claimed is:

1. A boron-containing aluminum material comprising a matrix including an aluminum or aluminum alloy powder, and a boride powder, the boride powder being dispersed in the matrix, wherein the boride powder includes multiple kinds of first boride particles selected from the group consisting of $AlB_{12}$, $CaB_6$, and $SiB_6$, multiple kinds of second boride particles selected from the group consisting of FeB, $MnB_2$, $Fe_2B$, and $AlB_2$, and inevitable impurity particles.

2. The boron-containing aluminum material according to claim 1,
wherein the ratio of the second boride particles occupied in the boride powder is 20 mass % or more.

3. The boron-containing aluminum material according to claim 1,
wherein the ratio of the first boride particles occupied in the boride powder is 50 mass % or more.

4. The boron-containing aluminum material according to claim 1,
wherein the ratio of particles with a particle size of 350 μm or less and greater than zero of the first boride particles and the second boride particles occupied in the boride powder is 90 mass % or more.

5. The boron-containing aluminum material according to claim 1,
wherein the average particle size of the boride powder is 1.5 times to 4 times the average particle size of the aluminum or aluminum alloy powder.

6. A boron-containing aluminum material comprising a matrix including an aluminum or aluminum alloy powder, and a boride powder, the boride powder being dispersed in the matrix, wherein the boride powder includes at least one or more kinds of first boride particles selected from the group consisting of $AlB_{12}$, $CaB_6$, and $SiB_6$, at least one or more kinds of second boride particles selected from the group consisting of FeB, $MnB_2$, $Fe_2B$, and $AlB_2$, and inevitable impurity particles, and wherein the density of B-10 included in the boron-containing aluminum material is between 0.048 and 0.104 g/cm³.

* * * * *